(12) United States Patent
Huang

(10) Patent No.: US 12,176,845 B2
(45) Date of Patent: Dec. 24, 2024

(54) HYBRID SOLAR WIND POWER GENERATION DEVICE

(71) Applicant: Ping-Chun Huang, New Taipei (TW)

(72) Inventor: Ping-Chun Huang, New Taipei (TW)

( * ) Notice: Subject to any disclaimer, the term of this patent is extended or adjusted under 35 U.S.C. 154(b) by 24 days.

(21) Appl. No.: 18/345,160

(22) Filed: Jun. 30, 2023

(65) Prior Publication Data

US 2024/0014767 A1  Jan. 11, 2024

(30) Foreign Application Priority Data

Jul. 5, 2022 (TW) .................................. 111125226

(51) Int. Cl.
| | |
|---|---|
| *H02S 10/12* | (2014.01) |
| *F03D 9/00* | (2016.01) |
| *F03D 9/25* | (2016.01) |
| *H02S 30/20* | (2014.01) |

(52) U.S. Cl.
CPC .............. *H02S 10/12* (2014.12); *F03D 9/007* (2013.01); *F03D 9/25* (2016.05); *H02S 30/20* (2014.12); *F05B 2220/706* (2013.01); *F05B 2220/708* (2013.01); *F05B 2260/4031* (2013.01)

(58) Field of Classification Search
CPC ......... H02S 10/12; Y02E 10/50; F03D 9/007; F03D 9/25; F05B 2220/706; F05B 2220/708
See application file for complete search history.

(56) References Cited

U.S. PATENT DOCUMENTS

| | | | | |
|---|---|---|---|---|
| 4,553,037 A | * | 11/1985 | Veazey | .................... F03D 13/25 290/55 |
| 7,008,171 B1 | * | 3/2006 | Whitworth | .............. H02S 10/12 416/243 |
| 7,453,167 B2 | * | 11/2008 | Gilbert | ...................... F03D 9/11 290/55 |
| 8,043,499 B2 | * | 10/2011 | Saeed | ....................... C02F 9/20 290/55 |
| 8,282,236 B2 | * | 10/2012 | Pelken | .................... H02S 10/12 362/183 |
| 8,866,320 B2 | * | 10/2014 | Perregrini | ................. F03D 9/25 290/44 |

(Continued)

FOREIGN PATENT DOCUMENTS

| | | | | |
|---|---|---|---|---|
| CA | 2769079 A1 | * | 8/2013 | ............. F03D 9/007 |
| GB | 2483086 A | * | 2/2012 | ................ F03D 1/02 |
| WO | WO-2012025724 A2 | * | 3/2012 | ............... F03D 1/02 |

*Primary Examiner* — Pedro J Cuevas
(74) *Attorney, Agent, or Firm* — Rosenberg, Klein & Lee

(57) ABSTRACT

A hybrid solar wind power generation device includes a wind-driven module and a solar module drivingly connected with a drive shaft of a power generator. The wind-driven module has a wind-driven blade set drivable by wind power to drive the drive shaft for driving the power generator to generate power. The solar panel set has multiple solar panels arranged at intervals to drive the motor for driving the solar panel and the drive shaft to rotate. Both the wind-driven module and the solar module serve to drive the drive shaft for driving the power generator to generate power. During the process of power generation, the sunlight passes through the hollow sections between the wind-driven blades and the solar panels in rotation and project onto the ground. This improves the shortcoming that the sunlight is blocked from the space under the equipment.

64 Claims, 7 Drawing Sheets

(56) References Cited

U.S. PATENT DOCUMENTS

| | | | |
|---|---|---|---|
| 9,689,372 B2* | 6/2017 | Gonzalez | F03D 9/25 |
| 10,094,361 B2* | 10/2018 | Bardia | H02K 7/183 |
| 10,518,657 B2* | 12/2019 | Wheatley | B60L 53/14 |
| 10,612,522 B2* | 4/2020 | Al Tarabsheh | H01R 43/10 |
| 11,053,921 B2* | 7/2021 | Gong | F03D 9/007 |
| 11,060,505 B2* | 7/2021 | Saeed | F03D 3/064 |
| 11,689,146 B2* | 6/2023 | Al Tarabsheh | F03D 9/007 |
| | | | 136/248 |
| 11,835,031 B2* | 12/2023 | Hench | F03D 9/25 |
| 2006/0210389 A1* | 9/2006 | St-Germain | F03D 3/005 |
| | | | 415/4.2 |
| 2008/0037243 A1* | 2/2008 | Discoe | F21S 9/026 |
| | | | 362/183 |
| 2008/0047270 A1* | 2/2008 | Gilbert | F03D 9/11 |
| | | | 60/641.12 |
| 2009/0160196 A1* | 6/2009 | Metzloff | F03D 3/0463 |
| | | | 290/55 |
| 2010/0101988 A1* | 4/2010 | Saeed | F03D 9/25 |
| | | | 290/55 |
| 2010/0132234 A1* | 6/2010 | Winkler | F03D 9/00 |
| | | | 40/430 |
| 2010/0133850 A1* | 6/2010 | Winkler | F03D 9/25 |
| | | | 290/55 |
| 2010/0220466 A1* | 9/2010 | Pelken | H02S 10/12 |
| | | | 362/183 |
| 2010/0220467 A1* | 9/2010 | Daidone | F21S 9/043 |
| | | | 362/183 |
| 2011/0167687 A1* | 7/2011 | Winkler | F03D 3/005 |
| | | | 29/592.1 |
| 2011/0204644 A1* | 8/2011 | Perregrini | B63B 21/50 |
| | | | 290/53 |
| 2012/0074706 A1* | 3/2012 | Lynn | F03D 9/25 |
| | | | 290/55 |
| 2012/0133149 A1* | 5/2012 | Ioana | F03D 3/005 |
| | | | 290/55 |
| 2012/0134823 A1* | 5/2012 | Tully | F03D 1/0633 |
| | | | 416/131 |
| 2012/0207604 A1* | 8/2012 | Hobson | F03D 3/062 |
| | | | 416/147 |
| 2012/0302228 A1* | 11/2012 | Gray | H02J 3/381 |
| | | | 307/69 |
| 2013/0106193 A1* | 5/2013 | Bryson | H02S 10/10 |
| | | | 307/73 |
| 2013/0121835 A1* | 5/2013 | Polaski | F03D 3/062 |
| | | | 416/204 R |
| 2013/0170949 A1* | 7/2013 | Samuels | F03D 3/061 |
| | | | 415/121.3 |
| 2014/0265598 A1* | 9/2014 | Isabella | F03D 9/25 |
| | | | 416/146 R |
| 2015/0098795 A1* | 4/2015 | Gonzalez | H02S 10/12 |
| | | | 415/4.2 |
| 2015/0337809 A1* | 11/2015 | Jordan, Sr. | H02S 10/12 |
| | | | 290/55 |
| 2016/0141911 A1* | 5/2016 | Al-Garni | H02J 7/35 |
| | | | 307/48 |
| 2017/0023191 A1* | 1/2017 | Magnotta | F21L 14/04 |
| 2017/0096985 A1* | 4/2017 | Bardia | H02K 7/183 |
| 2018/0003353 A1* | 1/2018 | Izradel | F03D 9/25 |
| 2018/0180028 A1* | 6/2018 | Gong | F03B 13/1845 |
| 2018/0347546 A1* | 12/2018 | Piskorz | F03D 3/0427 |
| 2018/0372073 A1* | 12/2018 | Al Tarabsheh | H02S 10/12 |
| 2019/0225091 A1* | 7/2019 | Wheatley | B60L 53/51 |
| 2020/0132047 A1* | 4/2020 | Saeed | F03D 9/25 |
| 2022/0290649 A1* | 9/2022 | Hench | F03D 3/064 |
| 2023/0412113 A1* | 12/2023 | Al Tarabsheh | F03D 9/007 |
| 2024/0060467 A1* | 2/2024 | Hench | F03D 9/11 |
| 2024/0209837 A1* | 6/2024 | Ghinda | H02S 10/40 |
| 2024/0301867 A1* | 9/2024 | Podhola | F03D 3/02 |

* cited by examiner

HYBRID SOLAR WIND POWER GENERATION DEVICE

BACKGROUND OF THE INVENTION

1. Field of the Invention

The present invention relates generally to a hybrid solar wind power generation device, and more particularly to a hybrid solar wind power generation device including a wind-driven module and a complementary solar module, which are both drivingly connected with a drive shaft for driving a power generator to generate power. In addition, during the process of power generation, sunlight can intermittently pass through the wind-driven module and the solar module and project onto the ground or space thereunder.

2. Description of the Related Art

Along with the increase of awareness of environmental protection, those pollution-free green energies such as solar energy and wind power have been widely applied to various fields in modern life. A conventional solar photovoltaic device is capable of converting sunlight into electrical energy. In general, the solar photovoltaic device has multiple solar panels securely arranged in predetermined positions directed to the sun for maximally receiving sunlight. For lowering the cost for setting up these solar panels, the solar panels generally are not equipped with any movable mechanism so that the solar panels cannot be moved as necessary. As a result, the existing solar photovoltaic device can hardly achieve optimal power generation efficiency to meet the principle of economical benefit. In order to increase the power generation capability of the solar photovoltaic device, generally the number of the solar panels and the sunshine area of the solar photovoltaic device are increased. In practice, the solar panels are fixed panels for receiving sunshine. In this case, the fixed panels will block the sunlight from a great area of ground and space under the solar panels. Due to long-term lack in sunshine, the ground under the solar panels can be hardly utilized for farming, planting or culture. This leads to waste of land resource.

A prior art discloses a green artistic pavilion. The pavilion has a solar roof, (that is, a solar panel), and a wind-driven power generation device for generating power to provide necessary electrical energy for illumination device of the pavilion. In such structure, the solar roof and the wind-driven power generation device respectively operate to generate power. A controller disposed in a battery device serves to integrate and store the electrical energy.

Another prior art discloses a hybrid solar wind power generation cabinet with vehicle speed alert function. The hybrid solar wind power generation cabinet has a cabinet main body, in which a wind-driven power generation module and a speed alerter are disposed. In addition, a solar panel is disposed on outer side of the cabinet main body. The solar panel and the wind-driven power generation device complementarily generate power to provide necessary electrical energy for the speed alerter. In addition, according to the change of the power generation capability of the wind-driven power generation module, the speed alerter can judge the moving speed of the cabinet main body. In such structure, the solar panel and the wind-driven power generation module also respectively operate to generate power and a power control module is used to integrate and store the electrical energy.

The other prior art discloses a hybrid solar wind power generation device. The hybrid solar wind power generation device includes a wind-driven power generation assembly and a solar panel connected therewith. The wind-driven power generation assembly is drivable by wind to drive a power generation unit to generate power. The solar panel serves to cooperatively convert solar energy into electrical energy. In such structure, the solar panel and the wind-driven power generation assembly also respectively operate to generate power. The wind-driven power generation assembly serves to drive the power generation unit to generate power, while the solar panel directly converts sunlight into electrical energy (without driving the power generation unit to generate power). Then all the electrical energy (generated by the power generation unit and the solar panel) is integrated and stored for successive reuse.

In practical application of the above conventional structures, the electrical energy converted from the sunlight by the solar panel and the electrical energy generated by the power generator driven by the wind-driven power generation assembly (the wind-driven power generation module) respectively have different voltaic specifications and current properties. Therefore, it is necessary to further use a power control module (or controller) to integrate the electrical energy so as to meet the requirement for reuse or storage. The complicated electronic circuit structure of such power control module (or controller) not only increases the cost for setting up the entire device, but also leads to increase of possibility of failure. Therefore, the above conventional hybrid solar wind power generation devices have many shortcomings in application.

It is therefore tried by the applicant to provide a hybrid solar wind power generation device to eliminate the shortcomings of the conventional hybrid solar wind power generation devices in practical application.

SUMMARY OF THE INVENTION

It is therefore a primary object of the present invention to provide a hybrid solar wind power generation device, which includes at least one wind-driven module and at least one solar module drivingly connected with a drive shaft of one single preset power generator. The wind-driven module is drivable by external wind power to drive the drive shaft to rotate for making the power generator generate power. The solar module has a solar panel set and a motor. The solar panel set has multiple solar panels arranged at intervals and multiple hollow sections defined between the solar panels. The solar panel set serves to convert sunlight into electrical energy to drive the motor for driving the solar panel set and the drive shaft to rotate so as to make the power generator generate power. During the process of power generation, both the wind-driven module and the solar module are continuously rotated along with the drive shaft. Therefore, sunlight can intermittently pass through the hollow sections between the wind-driven module and the solar panels in rotation and project onto the ground (or the space under the wind-driven module and the solar module) for sunshine or illumination. Therefore, the sunlight is prevented from being blocked from the ground or the space under the wind-driven module and the solar module, whereby the ground or the space can be still utilized for farming, planting or culture without wasting land resource.

It is a further object of the present invention to provide the above hybrid solar wind power generation device, in which both the wind-driven module and the solar module serve to drive the drive shaft for driving the power generator to generate necessary power. Therefore, in the entire structure, it is unnecessary to use any power control module for integrating different voltaic specifications and current properties. This not only lowers the cost for setting up the entire mechanism, but also minimizes the possibility of failure of the mechanism. Therefore, the quality of the product is enhanced.

It is still a further object of the present invention to provide the above hybrid solar wind power generation device, in which an assembly of multiple wind-driven modules and multiple solar modules is disposed on the drive shaft of one single power generator so as to satisfy the necessary drive power requirement of various application environments or power generator sets. In addition, a transmission gear set can be connected between the power generator and the drive shaft so as to change the rotational speed of the drive shaft into a proper rotational speed for properly driving the power generator to generate power.

It is still a further object of the present invention to provide the above hybrid solar wind power generation device, in which the wind-driven modules, the solar modules and the power generators are disposed on a seat body. The width and structure of the seat body are varied with the volume and size of the wind-driven modules and the solar modules. Accordingly, the seat body has a minimal shade ratio so as to provide better sunlight penetration effect. In addition, the seat body can be designed with different forms and structures in accordance with the numbers of the wind-driven module, the solar modules and the power generators so as to satisfy different power generation requirements of different sites.

The present invention can be best understood through the following description and accompanying drawings, wherein:

DETAILED DESCRIPTION OF THE PREFERRED EMBODIMENTS

Figure 1:
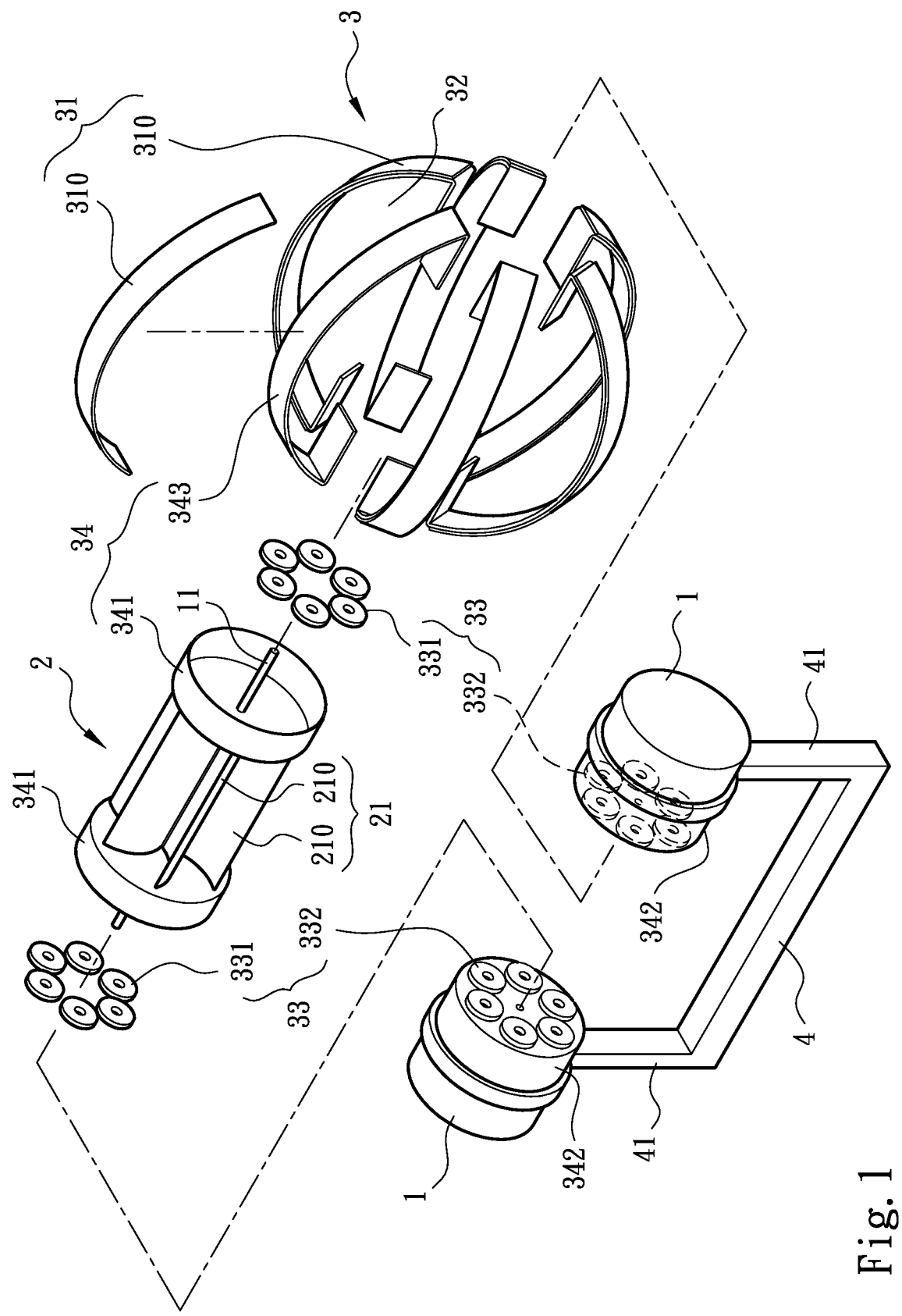
FIG. 1 is a perspective partially exploded view of a first embodiment of the present invention.
Figure 2:
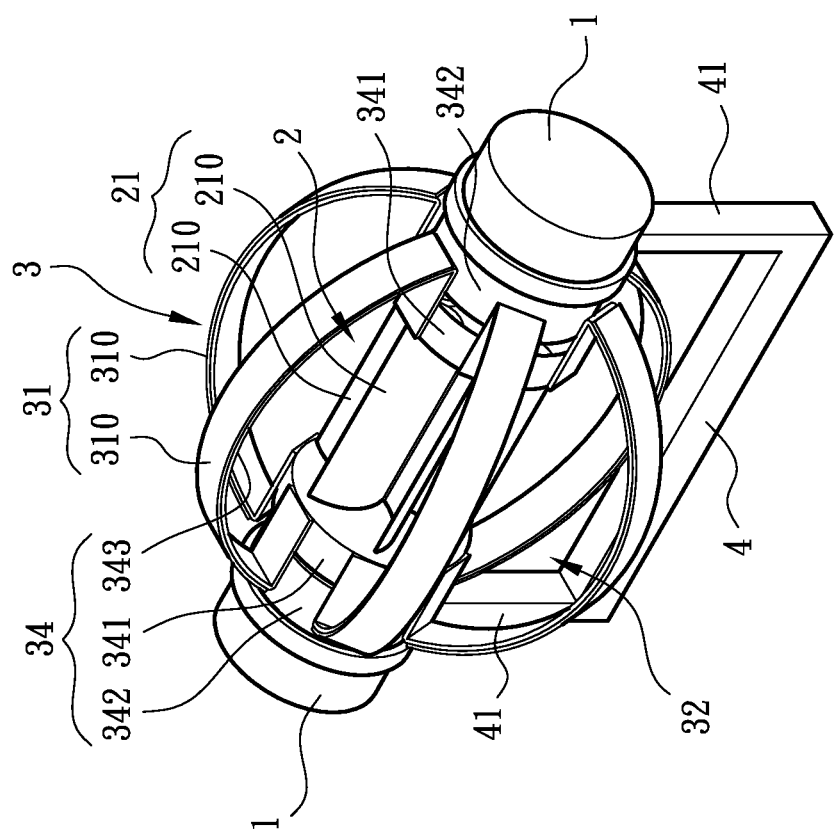
FIG. 2 is a perspective assembled view of the first embodiment of the present invention.
Figure 3:
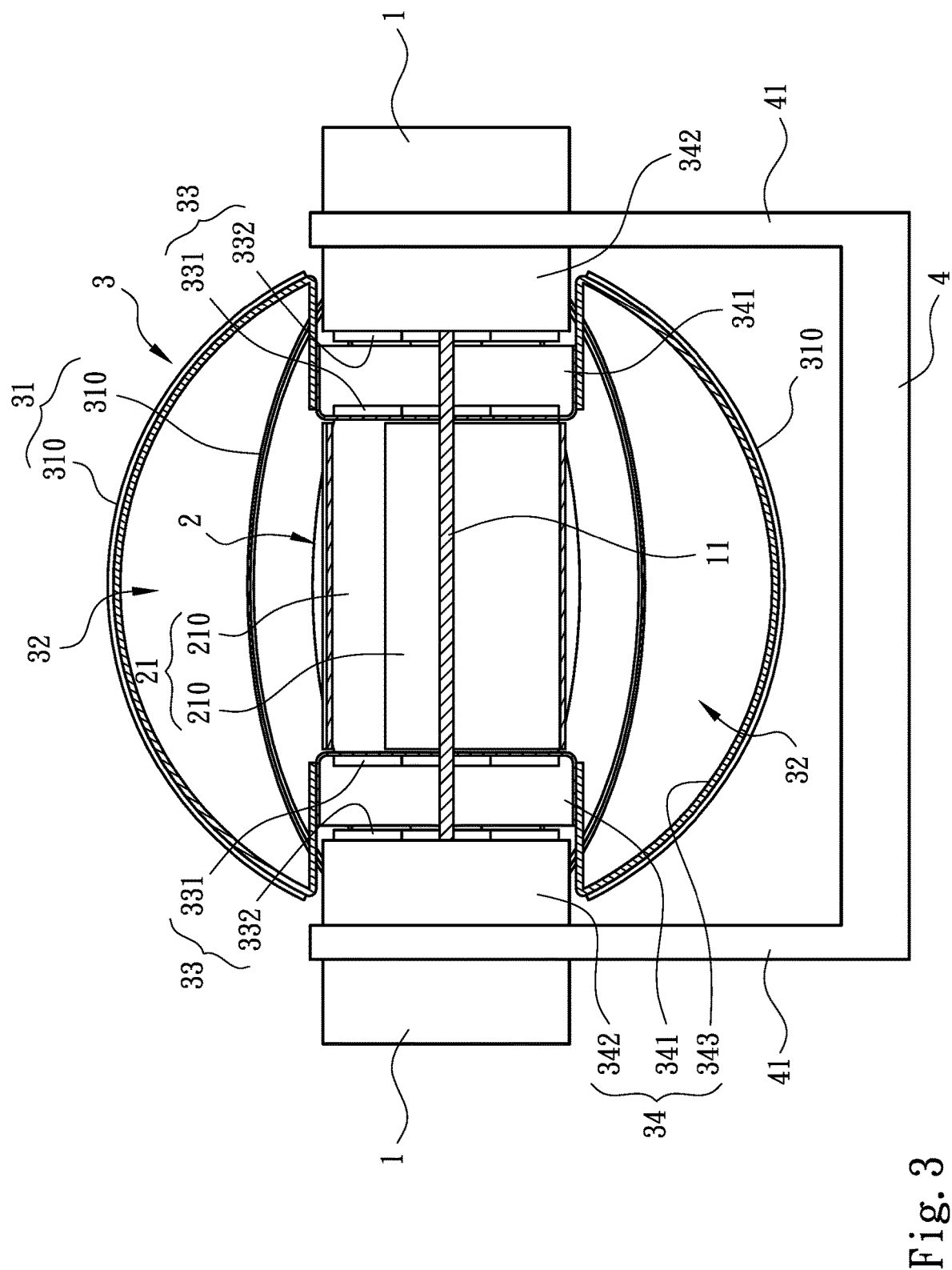
FIG. 3 is a side sectional view of the first embodiment of the present invention, showing the assembled sections of the wind-driven module and the solar module of the present invention.

Please refer to FIGS. 1 to 3. According to a first embodiment of the present invention, the hybrid solar wind power generation device of the present invention includes a power generator 1, a wind-driven module 2 and a solar module 3. The power generator 1 is connected with a drive shaft 11, which is drivable by external force. As necessary, a transmission gear set (not shown) can be further connected between the power generator 1 and the drive shaft 11, whereby the rotational speed of the drive shaft 11 can be changed into a proper rotational speed for driving an internal mechanism of the power generator 1 to generate power. In practice, two power generators 1 can be alternatively respectively assembled with two ends of the drive shaft 11 to vary the application for satisfying different power generation requirements of different sites and enhancing the power generation performance as a whole.

The wind-driven module 2 is connected with the drive shaft 11 (directly or via a connection member) and disposed between the drive shaft 11 and a solar panel set 31 of the solar module 3. The wind-driven module 2 is drivable by external wind power to rotate the drive shaft 11 for driving the power generator 1 to generate power. In a preferred embodiment, the wind-driven module 2 has a wind-driven blade set 21 disposed around the drive shaft 11 (as shown in FIGS. 1 to 5).

As shown in the drawings, the wind-driven blade set 21 is composed of multiple wind-driven blades 210 each having an arcuate cross section. Inner edges of the wind-driven blades 210 are adjacent to or connected with the drive shaft 11, while outer edges of the wind-driven blades 210 are positioned at equal intervals and extend in an axial direction of the drive shaft 11 in parallel to each other.

The solar module 3 has the solar panel set 31, which is rotatable with the drive shaft 11 and connected with a motor 33 of the drive shaft 11 (directly or via a connection member). The solar panel set 31 has multiple solar panels 310 arranged at intervals. Multiple hollow sections 32 are defined between the solar panels 310 for sunlight to pass through. The solar panel set 31 serves to convert sunlight into electrical energy for driving the motor 33 to drive the solar panel set 31 and the drive shaft 11 to rotate. When the drive shaft 11 rotates, the drive shaft 11 drives the power generator 1 to generate power. Also, during the rotation of the solar panel set 31, the sunlight can intermittently pass through the hollow sections 32 to project onto the ground or space under the solar panel set 31 and the wind-driven blade set 21 for sunshine or illumination.

In a preferred embodiment, the drive shaft 11 can be connected with a support assembly 34 as necessary. The support assembly 34 has two movable seats 341 secured on the drive shaft 11 at an interval (and rotatable with the drive shaft 11). Two fixed seats 342 are coaxially disposed beside the movable seats 341.

Figure 6:
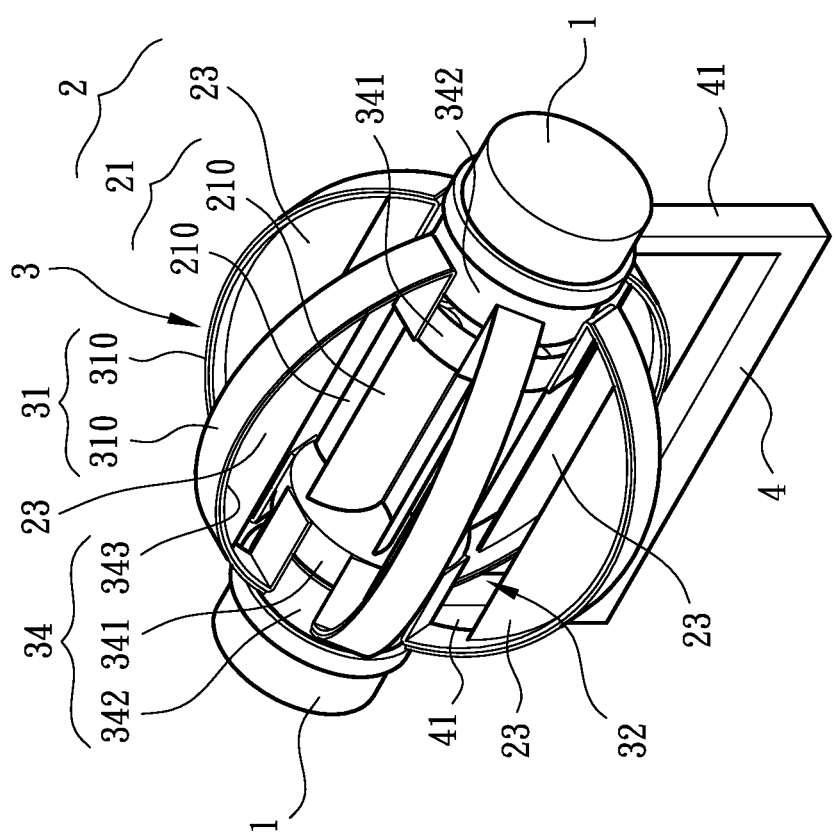
FIG. 6 is a perspective assembled view of a fourth embodiment of the present invention.
Figure 7:
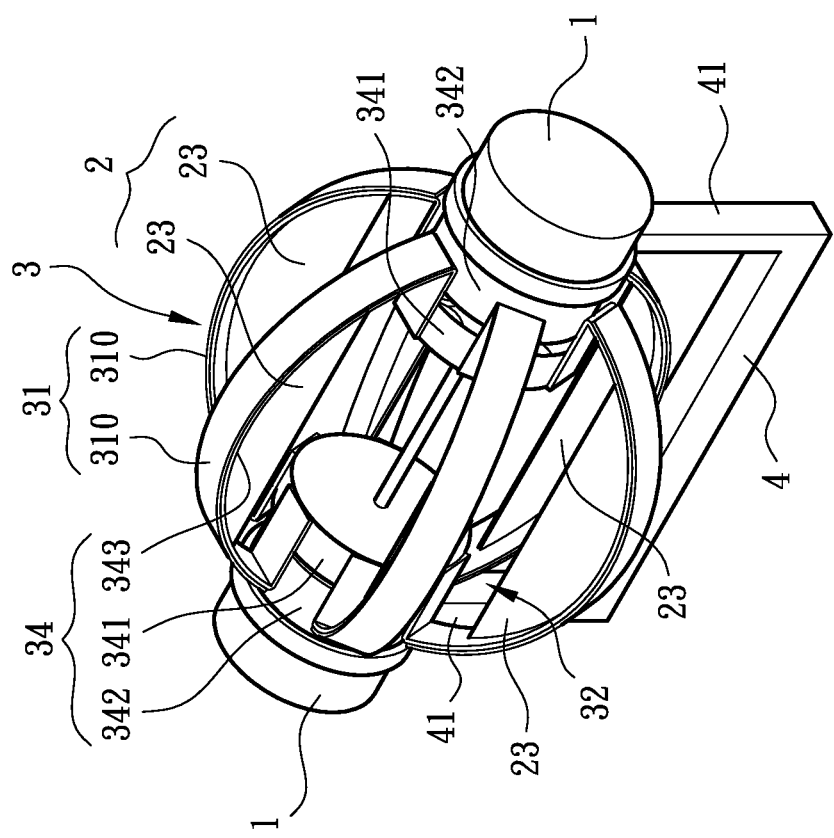
FIG. 7 is a perspective assembled view of a fifth embodiment of the present invention.

The movable seats 341 are rotatable relative to the fixed seats 342. In addition, multiple grid supports 343 are disposed between the two movable seats 341 at equal intervals. The grid supports 343 are annularly arranged and centered at the axis of the drive shaft 11. As necessary, the grid supports 343 can extend linearly or be curved. In the case that the grid supports 343 are curved, two end sections of the grid supports 343 can be respectively connected with outer circumferences of the two movable seats 341 and positioned around the drive shaft 11. The solar panels 310 are flexible (soft) solar panels (sheets) attached to outer faces of the grid supports 343, whereby the hollow sections 32 are naturally formed between the solar panels 310 (grid supports 343). The solar panel set 31 can surround the wind-driven blade set 21. Alternatively, each grid support 343 has a wind-driven blade 23 extending from the grid support 343 to the drive shaft 11 (as shown in FIGS. 6 and 7). The wind-driven blade 23 is disposed in a position in adjacency to a back face of the solar panel 310 (such as a back face of the grid support 343). The wind-driven blades 23 are also coaxially and synchronously rotatable with the solar panel set 31.

In this embodiment, the power generator 1, the wind-driven module 2 and the solar module 3 are assembled on a seat body 4. The seat body 4 has two support sections 41 respectively connected with the two fixed seats 342. The power generator 1 is disposed on an outer side of at least one of the support sections 41. The wind-driven module 2 and the solar module 3 are disposed between the two support sections 41. The motor 33 has multiple magnetic bodies 332 arranged in the fixed seats 342 and multiple winding members 331 arranged in the movable seats 341 corresponding to the magnetic bodies 332 respectively. A drive circuit (not shown) is used to drive the respective winding members 331 to generate interactive magnetic force effect relative to the magnetic bodies 332, whereby the drive shaft 11 is driven as a brushless direct current (BLDC) motor. Accordingly, the drive shaft 11 can be pivotally rotated relative to the fixed seats 342 (as the power generator 1). However, in practice, the winding members 331 and the magnetic bodies 332 of the motor 33 can be alternatively designed with different forms of various other motors so as to provide different driving means for driving the drive shaft 11 to rotate.

In practice, the width and structural design of the seat body 4 are varied with the volume and size of the wind-driven module 2 and the solar module 3. The seat body 4 has a minimal shade ratio so as not to unnecessarily block the sunlight passing through the wind-driven module 2 and the solar module 3.

In practical operation of the above structure, when air convection takes place in the external environment, the wind power can directly push the wind-driven blade set 21 of the wind-driven module 2, whereby the drive shaft 11 and the solar panel set 31 synchronously or asynchronously drivingly rotate. At this time, the drive shaft 11 drives the power generator 1 to generate power. In an environment with sunshine, the solar panel set 31 of the solar module 3 receives sunlight to generate electrical energy for driving the motor 33 to drive the solar panel set 31 and the drive shaft 11 to rotate. Accordingly, the power generator 1 is further driven to generate power. During the above process of power generation, the wind-driven blade set 21 of the wind-driven module 2 and the solar panel set 31 of the solar module 3 are both rotated along with the drive shaft 11. Therefore, the sunlight can intermittently pass through the hollow sections 32 between the solar panels 310 by different angles and project onto the ground under the hollow sections 32 (or the space under the solar panel set 31 and the wind-driven blade set 21) for sunshine or illumination. Accordingly, the space or the ground under the solar panel set 31 and the wind-driven blade set 21 can utilize the sunshine to keep the operation of farming, planting or culture without wasting land resource. Moreover, in an environment lacking wind power or sunlight, the solar panel set 31 and the wind-driven blade set 21 are drivingly connected with each other and complementary to each other so as to keep rotating for generating power without shading sunlight. Therefore, the wind power and the solar energy are complementary and assistant to each other to keep operating for generating power.

Figure 4:
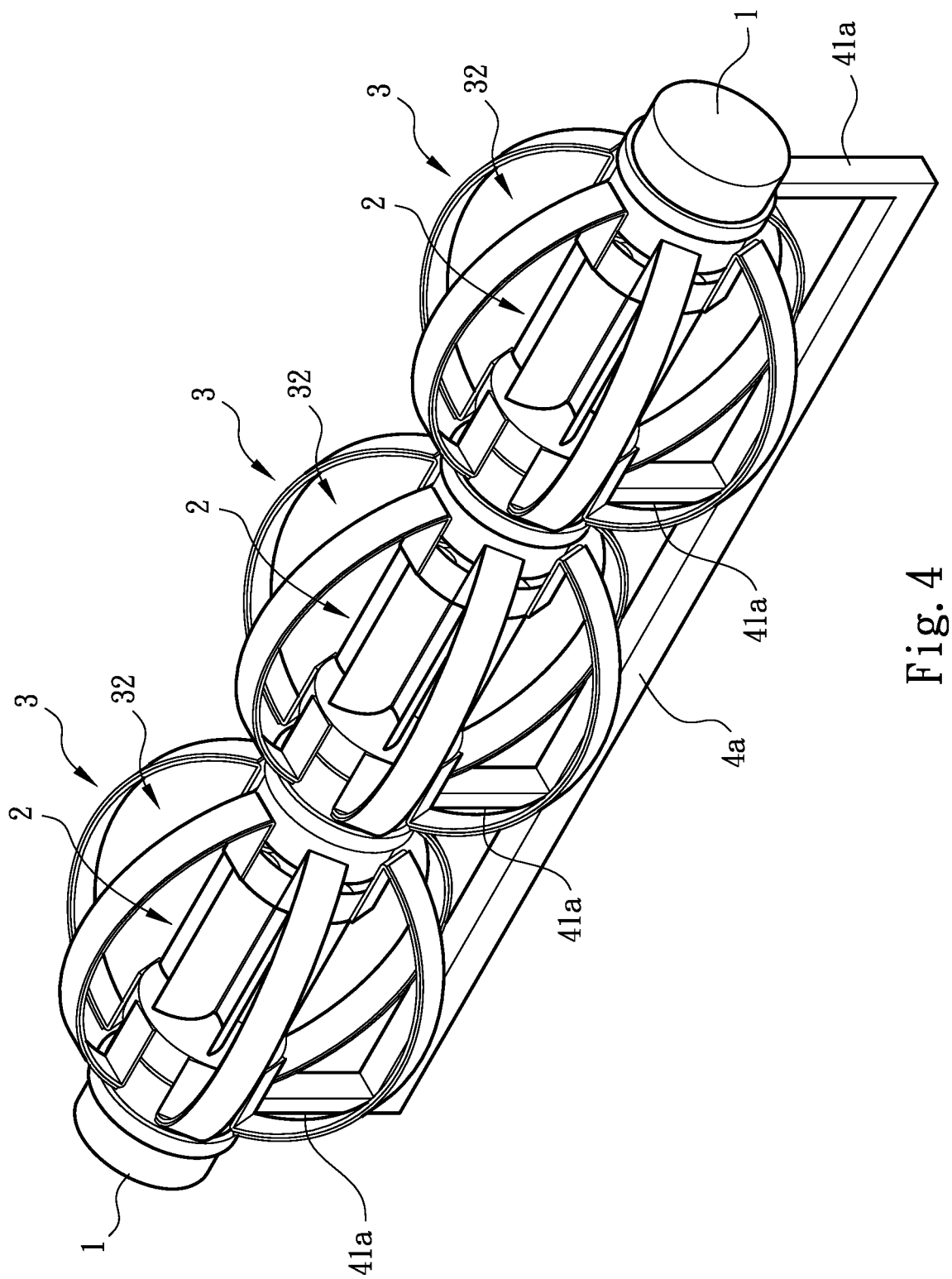
FIG. 4 is a perspective assembled view of a second embodiment of the present invention.

Please refer to FIG. 4. According to a second embodiment of the present invention, the hybrid solar wind power generation device of the present invention includes a power generator 1, a wind-driven module 2 and a solar module 3, which are identical to those of the first embodiment and further includes a transverse seat body 4a. The seat body 4a has multiple vertical support sections 41a arranged at intervals. The power generator 1 is disposed on an outer side of a support section 41a of at least one end section of the seat body 4a. An assembly of multiple wind-driven blade sets 21 of multiple wind-driven modules 2 and multiple solar panel sets 31 of multiple solar modules 3 is arranged between the support sections 41a and supported thereby. The multiple wind-driven blade sets 21 and the multiple solar panel sets 31 are disposed on one single drive shaft 11 to apply greater driving force to the drive shaft 11 for driving the power generator 1 to generate power. Accordingly, the application of the hybrid solar wind power generation device of the present invention is variable.

Figure 5:
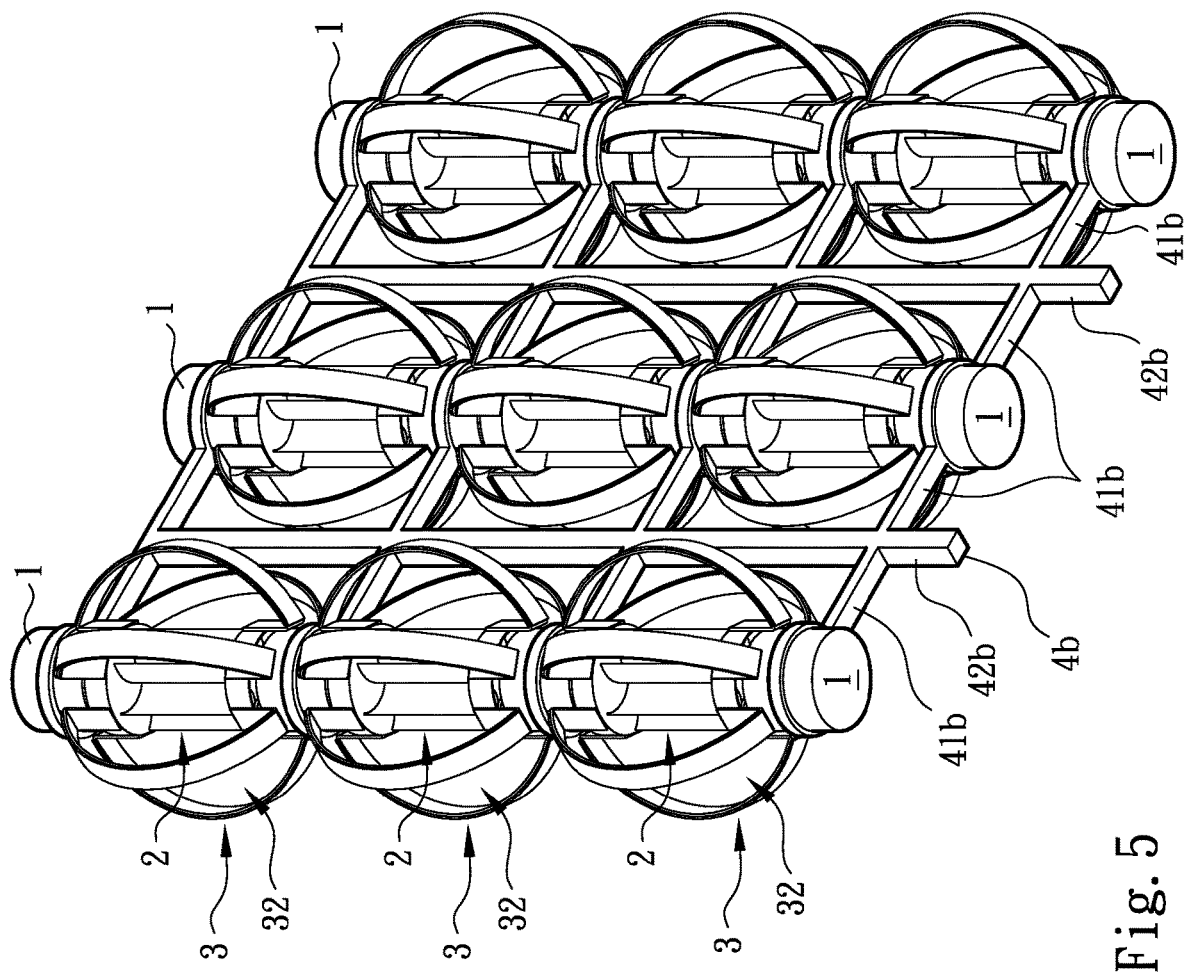
FIG. 5 is a perspective assembled view of a third embodiment of the present invention.

Please refer to FIG. 5. According to a third embodiment of the present invention, the hybrid solar wind power generation device of the present invention includes a power generator 1, a wind-driven module 2 and a solar module 3, which are identical to those of the first embodiment and further includes a vertical seat body 4b. The seat body 4b has multiple checker-like support sections 41b. The power generator 1 is disposed on a lateral (outer) side of a support section 41b of each of upper and lower ends of the seat body 4b. In addition, multiple leg sections 42b downward protrude from the seat body 4b to support and keep the power generator 1 under the seat body 4b at a proper height or in a proper position so as to avoid damage of the power generator 1 due to compression or collision.

An assembly of multiple wind-driven blade sets 21 and multiple solar panel sets 31 is supported between the checker-like support sections 41b. In addition, the assembly of the wind-driven blade sets 21 and the solar panel sets 31 is vertically arranged and disposed on one single vertical drive shaft 11. Accordingly, the multiple vertically arranged wind-driven blade sets 21 and the multiple vertically arranged solar panel sets 31 together form a large-scale vertical hybrid solar wind power generator set, in which the multiple wind-driven blade sets 21 and the multiple solar panel sets 31 drive the drive shafts 11 for driving the power generators 1 on the upper and lower sides (or in adjacency to each other) to operate and generate power. Accordingly, the application of the hybrid solar wind power generation device of the present invention is variable.

In conclusion, the hybrid solar wind power generation device of the present invention can truly respectively utilize wind power and solar energy to drive the power generator. Moreover, in operation, the sunlight can intermittently downward pass through the wind-driven blade set and the solar panel set to project onto the ground thereunder. The hybrid solar wind power generation device of the present invention is inventive and advanced and the application range of the hybrid solar wind power generation device of the present invention is widened.

The above embodiments are only used to illustrate the present invention, not intended to limit the scope thereof. Many modifications of the above embodiments can be made without departing from the spirit of the present invention.

What is claimed is:

1. A hybrid solar wind power generation device comprising:
   at least one power generator (1) connected with a drive shaft (11) drivable by external power;
   at least one wind-driven module (2) drivingly connected with the drive shaft (11), the wind-driven module (2) being drivable by external wind power to drive the drive shaft (11) to rotate for making the power generator (1) generate power; and
   at least one solar module (3), the solar module (3) having a solar panel set (31) capable of converting sunlight into electrical energy and a motor (33) drivingly connected with the drive shaft (11), the solar panel set (31) being rotatable with the drive shaft (11), the solar panel set (31) having multiple solar panels (310) arranged at intervals, multiple hollow sections (32) being defined between the solar panels (310), the solar panel set (31) serving to convert sunlight into electrical energy to drive the motor (33) for driving the solar panel set (31) and the drive shaft (11) to rotate so as to make the power generator (1) generate power.

2. The hybrid solar wind power generation device as claimed in claim 1, wherein the wind-driven module (2) has at least one wind-driven blade set (21), the wind-driven blade set (21) being composed of multiple wind-driven blades (210, 23) disposed between outer circumference of the drive shaft (11) and the solar panel set (31).

3. The hybrid solar wind power generation device as claimed in claim 2, wherein the wind-driven blades (210) are disposed on the outer circumference of the drive shaft (11).

4. The hybrid solar wind power generation device as claimed in claim 3, wherein the drive shaft (11) is further connected with a support assembly (34), the support assembly (34) having two movable seats (341) secured on the drive shaft (11) at an interval and two fixed seats (342) coaxially disposed beside the two movable seats (341), the movable seats (341) being rotatable relative to the fixed seats (342), multiple grid supports (343) being disposed between the two movable seats (341) at equal intervals, the grid supports (343) being annularly arranged and centered at an axis of the drive shaft (11), the solar panels (310) being flexible solar panels attached to outer faces of the grid supports (343).

5. The hybrid solar wind power generation device as claimed in claim 3, wherein each solar panel (310) has two end sections and a curved section extending between the two end sections.

6. The hybrid solar wind power generation device as claimed in claim 3, wherein the motor (33) has multiple magnetic bodies (332) securely connected with the power generator (1) and multiple winding members (331) drivingly connected with the drive shaft (11).

7. The hybrid solar wind power generation device as claimed in claim 3, wherein multiple wind-driven modules (2) and multiple solar modules (3) are disposed on the drive shaft (11).

8. The hybrid solar wind power generation device as claimed in claim 3, wherein a transmission gear set is connected between the power generator (1) and the drive shaft (11).

9. The hybrid solar wind power generation device as claimed in claim 2, wherein each wind-driven blade (23) is disposed in a position in adjacency to a back face of the solar panel (310) and extends to the drive shaft (11).

10. The hybrid solar wind power generation device as claimed in claim 9, wherein the drive shaft (11) is further connected with a support assembly (34), the support assembly (34) having two movable seats (341) secured on the drive shaft (11) at an interval and two fixed seats (342) coaxially disposed beside the two movable seats (341), the movable seats (341) being rotatable relative to the fixed seats (342), multiple grid supports (343) being disposed between the two movable seats (341) at equal intervals, the grid supports (343) being annularly arranged and centered at an axis of the drive shaft (11), the solar panels (310) being flexible solar panels attached to outer faces of the grid supports (343).

11. The hybrid solar wind power generation device as claimed in claim 9, wherein each solar panel (310) has two end sections and a curved section extending between the two end sections.

12. The hybrid solar wind power generation device as claimed in claim 9, wherein the motor (33) has multiple magnetic bodies (332) securely connected with the power generator (1) and multiple winding members (331) drivingly connected with the drive shaft (11).

13. The hybrid solar wind power generation device as claimed in claim 9, wherein multiple wind-driven modules (2) and multiple solar modules (3) are disposed on the drive shaft (11).

14. The hybrid solar wind power generation device as claimed in claim 9, wherein a transmission gear set is connected between the power generator (1) and the drive shaft (11).

15. The hybrid solar wind power generation device as claimed in claim 2, wherein the solar panels (310) are annularly arranged around the drive shaft (11) at equal intervals and centered at the drive shaft (11).

16. The hybrid solar wind power generation device as claimed in claim 15, wherein the drive shaft (11) is further connected with a support assembly (34), the support assembly (34) having two movable seats (341) secured on the drive shaft (11) at an interval and two fixed seats (342) coaxially disposed beside the two movable seats (341), the movable seats (341) being rotatable relative to the fixed seats (342), multiple grid supports (343) being disposed between the two movable seats (341) at equal intervals, the grid supports (343) being annularly arranged and centered at an axis of the drive shaft (11), the solar panels (310) being flexible solar panels attached to outer faces of the grid supports (343).

17. The hybrid solar wind power generation device as claimed in claim 15, wherein each solar panel (310) has two end sections and a curved section extending between the two end sections.

18. The hybrid solar wind power generation device as claimed in claim 15, wherein the motor (33) has multiple magnetic bodies (332) securely connected with the power generator (1) and multiple winding members (331) drivingly connected with the drive shaft (11).

19. The hybrid solar wind power generation device as claimed in claim 15, wherein multiple wind-driven modules (2) and multiple solar modules (3) are disposed on the drive shaft (11).

20. The hybrid solar wind power generation device as claimed in claim 15, wherein a transmission gear set is connected between the power generator (1) and the drive shaft (11).

21. The hybrid solar wind power generation device as claimed in claim 2, wherein the drive shaft (11) is further connected with a support assembly (34), the support assembly (34) having two movable seats (341) secured on the drive shaft (11) at an interval and two fixed seats (342) coaxially disposed beside the two movable seats (341), the movable seats (341) being rotatable relative to the fixed seats (342), multiple grid supports (343) being disposed between the two movable seats (341) at equal intervals, the grid supports (343) being annularly arranged and centered at an axis of the drive shaft (11), the solar panels (310) being flexible solar panels attached to outer faces of the grid supports (343).

22. The hybrid solar wind power generation device as claimed in claim 21, wherein the motor (33) has multiple magnetic bodies (332) securely connected with the power generator (1) and multiple winding members (331) drivingly connected with the drive shaft (11).

23. The hybrid solar wind power generation device as claimed in claim 21, wherein the motor (33) has multiple magnetic bodies (332) securely connected with the power generator (1) and multiple winding members (331) drivingly connected with the drive shaft (11), the winding members (331) being disposed in the movable seats (341), while the magnetic bodies (332) being disposed in the fixed seats (342).

24. The hybrid solar wind power generation device as claimed in claim 21, wherein multiple wind-driven modules (2) and multiple solar modules (3) are disposed on the drive shaft (11).

25. The hybrid solar wind power generation device as claimed in claim 21, wherein a transmission gear set is connected between the power generator (1) and the drive shaft (11).

26. The hybrid solar wind power generation device as claimed in claim 2, wherein each solar panel (310) has two end sections and a curved section extending between the two end sections.

27. The hybrid solar wind power generation device as claimed in claim 26, wherein the motor (33) has multiple magnetic bodies (332) securely connected with the power generator (1) and multiple winding members (331) drivingly connected with the drive shaft (11).

28. The hybrid solar wind power generation device as claimed in claim 26, wherein multiple wind-driven modules (2) and multiple solar modules (3) are disposed on the drive shaft (11).

29. The hybrid solar wind power generation device as claimed in claim 26, wherein a transmission gear set is connected between the power generator (1) and the drive shaft (11).

30. The hybrid solar wind power generation device as claimed in claim 2, wherein the motor (33) has multiple magnetic bodies (332) securely connected with the power generator (1) and multiple winding members (331) drivingly connected with the drive shaft (11).

31. The hybrid solar wind power generation device as claimed in claim 30, wherein multiple wind-driven modules (2) and multiple solar modules (3) are disposed on the drive shaft (11).

32. The hybrid solar wind power generation device as claimed in claim 30, wherein a transmission gear set is connected between the power generator (1) and the drive shaft (11).

33. The hybrid solar wind power generation device as claimed in claim 2, wherein the power generators (1) are disposed at two end sections of the drive shaft (11).

34. The hybrid solar wind power generation device as claimed in claim 2, wherein multiple wind-driven modules (2) and multiple solar modules (3) are disposed on the drive shaft (11).

35. The hybrid solar wind power generation device as claimed in claim 34, wherein a transmission gear set is connected between the power generator (1) and the drive shaft (11).

36. The hybrid solar wind power generation device as claimed in claim 2, wherein the power generator (1) is assembled and disposed on a seat body (4), the seat body (4) having at least one support section (41) for supporting the wind-driven module (2) and the solar module (3).

37. The hybrid solar wind power generation device as claimed in claim 2, wherein a transmission gear set is connected between the power generator (1) and the drive shaft (11).

38. The hybrid solar wind power generation device as claimed in claim 1, wherein the drive shaft (11) is further connected with a support assembly (34), the support assembly (34) having two movable seats (341) secured on the drive shaft (11) at an interval and two fixed seats (342) coaxially disposed beside the two movable seats (341), the movable seats (341) being rotatable relative to the fixed seats (342), multiple grid supports (343) being disposed between the two movable seats (341) at equal intervals, the grid supports (343) being annularly arranged and centered at an axis of the drive shaft (11), the solar panels (310) being flexible solar panels attached to outer faces of the grid supports (343).

39. The hybrid solar wind power generation device as claimed in claim 38, wherein the motor (33) has multiple magnetic bodies (332) securely connected with the power generator (1) and multiple winding members (331) drivingly connected with the drive shaft (11).

40. The hybrid solar wind power generation device as claimed in claim 38, wherein the motor (33) has multiple magnetic bodies (332) securely connected with the power generator (1) and multiple winding members (331) drivingly connected with the drive shaft (11), the winding members (331) being disposed in the movable seats (341), while the magnetic bodies (332) being disposed in the fixed seats (342).

41. The hybrid solar wind power generation device as claimed in claim 38, wherein the power generators (1) are disposed at two end sections of the drive shaft (11).

42. The hybrid solar wind power generation device as claimed in claim 38, wherein multiple wind-driven modules (2) and multiple solar modules (3) are disposed on the drive shaft (11).

43. The hybrid solar wind power generation device as claimed in claim 38, wherein the power generator (1) is assembled and disposed on a seat body (4), the seat body (4) having at least one support section (41) for supporting the wind-driven module (2) and the solar module (3).

44. The hybrid solar wind power generation device as claimed in claim 38, wherein a transmission gear set is connected between the power generator (1) and the drive shaft (11).

45. The hybrid solar wind power generation device as claimed in claim 1, wherein each solar panel (310) has two end sections and a curved section extending between the two end sections.

46. The hybrid solar wind power generation device as claimed in claim 45, wherein the motor (33) has multiple magnetic bodies (332) securely connected with the power generator (1) and multiple winding members (331) drivingly connected with the drive shaft (11).

47. The hybrid solar wind power generation device as claimed in claim 45, wherein the power generators (1) are disposed at two end sections of the drive shaft (11).

48. The hybrid solar wind power generation device as claimed in claim 45, wherein multiple wind-driven modules (2) and multiple solar modules (3) are disposed on the drive shaft (11).

49. The hybrid solar wind power generation device as claimed in claim 45, wherein the power generator (1) is assembled and disposed on a seat body (4), the seat body (4) having at least one support section (41) for supporting the wind-driven module (2) and the solar module (3).

50. The hybrid solar wind power generation device as claimed in claim 45, wherein a transmission gear set is connected between the power generator (1) and the drive shaft (11).

51. The hybrid solar wind power generation device as claimed in claim 1, wherein the motor (33) has multiple magnetic bodies (332) securely connected with the power generator (1) and multiple winding members (331) drivingly connected with the drive shaft (11).

52. The hybrid solar wind power generation device as claimed in claim 51, wherein the power generators (1) are disposed at two end sections of the drive shaft (11).

53. The hybrid solar wind power generation device as claimed in claim 51, wherein multiple wind-driven modules (2) and multiple solar modules (3) are disposed on the drive shaft (11).

54. The hybrid solar wind power generation device as claimed in claim 51, wherein the power generator (1) is assembled and disposed on a seat body (4), the seat body (4) having at least one support section (41) for supporting the wind-driven module (2) and the solar module (3).

55. The hybrid solar wind power generation device as claimed in claim 51, wherein a transmission gear set is connected between the power generator (1) and the drive shaft (11).

56. The hybrid solar wind power generation device as claimed in claim 1, wherein the power generators (1) are disposed at two end sections of the drive shaft (11).

57. The hybrid solar wind power generation device as claimed in claim 56, wherein multiple wind-driven modules (2) and multiple solar modules (3) are disposed on the drive shaft (11).

58. The hybrid solar wind power generation device as claimed in claim 56, wherein a transmission gear set is connected between the power generator (1) and the drive shaft (11).

59. The hybrid solar wind power generation device as claimed in claim 1, wherein multiple wind-driven modules (2) and multiple solar modules (3) are disposed on the drive shaft (11).

60. The hybrid solar wind power generation device as claimed in claim 59, wherein the power generator (1) is assembled and disposed on a seat body (4), the seat body (4) having at least one support section (41) for supporting the wind-driven module (2) and the solar module (3).

61. The hybrid solar wind power generation device as claimed in claim 59, wherein a transmission gear set is connected between the power generator (1) and the drive shaft (11).

62. The hybrid solar wind power generation device as claimed in claim 1, wherein the power generator (1) is assembled and disposed on a seat body (4), the seat body (4) having at least one support section (41) for supporting the wind-driven module (2) and the solar module (3).

63. The hybrid solar wind power generation device as claimed in claim 62, wherein a transmission gear set is connected between the power generator (1) and the drive shaft (11).

64. The hybrid solar wind power generation device as claimed in claim 1, wherein a transmission gear set is connected between the power generator (1) and the drive shaft (11).

* * * * *